(No Model.)

H. E. DEY.
SECONDARY BATTERY.

No. 473,147. Patented Apr. 19, 1892.

Witnesses:
Raphaël Netter
M. G. Tracy.

Inventor
Harry E. Dey
by
Duncan & Page
Attorneys.

UNITED STATES PATENT OFFICE.

HARRY E. DEY, OF NEW YORK, N. Y., ASSIGNOR TO PHŒBUS H. ALEXANDER, OF SAME PLACE.

SECONDARY BATTERY.

SPECIFICATION forming part of Letters Patent No. 473,147, dated April 19, 1892.

Application filed September 17, 1890. Renewed July 8, 1891. Serial No. 398,746. (No model.)

*To all whom it may concern:*

Be it known that I, HARRY E. DEY, a citizen of the United States, residing at New York, in the county and State of New York, have invented certain new and useful Improvements in Secondary Batteries, of which the following is a specification, reference being had to the drawings accompanying and forming a part of the same.

This invention is an improvement in secondary batteries and more particularly applicable to a form of battery shown and described in an application for Letters Patent filed by me September 10, 1890, No. 364,518, and which, described in general, is as follows: An insulated box or case for containing the solution and elements of a battery is divided into a number of compartments or cells. This I have heretofore done by using as the partitions the plates themselves. In other words, the negative plates extending across the box are packed in with rubber strips or blocks between their edges to form the partition and a positive plate is held up against one side of each such partition. To secure a good joint between the edge of the plate and the rubber packing, the negative plates while in the condition of spongy lead are pressed in such manner around their edges only as to leave projecting flanges or edges on one or both faces of solid lead; but to still more perfectly insure a water-tight partition between two adjacent cells I propose to use a thin sheet of lead interposed between contiguous positive and negative plates; but I have found that in using a lead plate in this manner the flanges or raised edges of the negative plates converted by compression into solid metallic lead may be dispensed with; and my invention also includes a particular form of lead-plate, the nature of which will be hereinafter more fully described, to be used in such cases.

Figure 1:
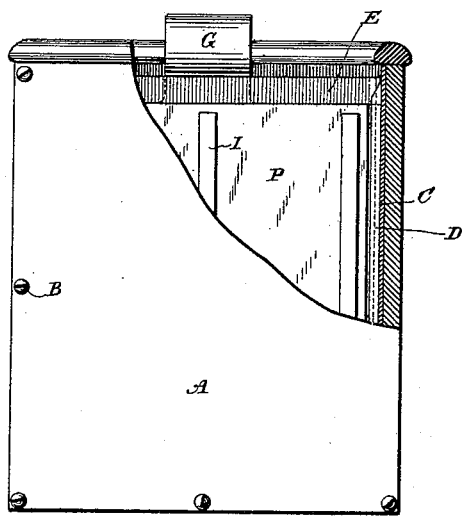
Figure 2:
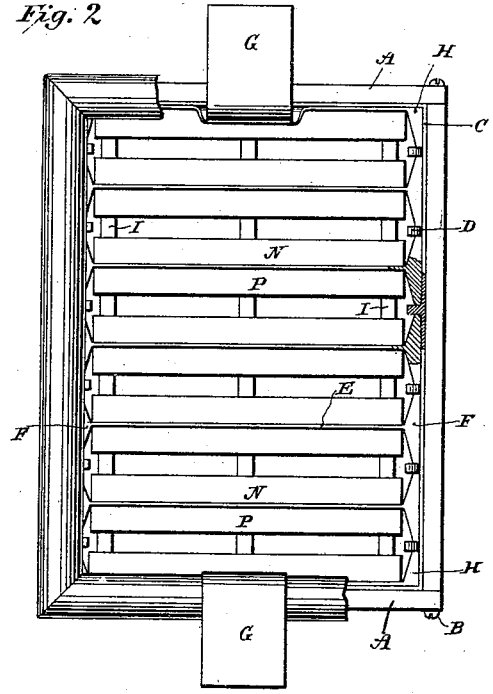

In the accompanying drawings, Figure 1 is a side elevation, with a portion shown in broken section, of a battery containing my invention. Fig. 2 is a top plan view of the same with parts removed.

I employ a box or case of insulating or insulated material having by preference, in order to simplify the assemblage of the parts of the battery, end plates A, that are secured by screws B. In this box I place a box or cell C, made of soft rubber or similar material, having ribs D, and of substantially the same character as I have heretofore used in my batteries, and I have furthermore described in my patent No. 418,700, of January 7, 1890. The ribs in this case are in one piece with the side of the rubber cell, which forms a waterproof and insulating lining to the containing-box. It will be understood, however, that in respect to this feature my invention is in no way limited to the special kind of lining used, nor to the precise character of rubber or other strips that may be employed in place of the ribs D.

I cast a number of plates E of lead, or I may use for this purpose any of the metals or alloys which have been proposed for the grids in those batteries in which such supports are used. These plates are formed with a flat sheet or body E, the function of which in the battery is solely to form a water-tight conducting-partition between two adjacent cells. This part of the plate may therefore and in practice is made as thin as practicable, so as to save both weight and space. Around the two sides and the lower edge of such plates is the flange F, forming a raised edge on each side of the plate and of a width about equal to the space between two of the rubber ribs D. The widened or flanged edges F are made somewhat thicker than the body of the plate, so as to be capable of withstanding a considerable compression. They may be simple square flanges of equal thickness; but I prefer that they should taper slightly from the middle to the edges, as shown. These plates are placed in the cell, the thickened edges or flanges F being forced into the spaces between the ribs D.

At the ends of the cell the lead plates used have a flange H on one side only, the other side being even and smooth and lying flat against the rubber lining of the cell. These end plates also have tongues G, extending up from them, which serve as the terminals of the battery. The ends A of the containing-case are then screwed or clamped in place, whereby sufficient pressure is applied to form tight joints between the ribs D and the edges of the parts F of the lead plates. The case is thus subdivided into a series of compartments, with conducting but impervious partitions between them. Into these compartments I then place the electrodes or positive and negative plates P N of the battery. In one of the end cells a positive plate is held in contact with the terminal or end plate E by rubber or other strips or blocks I, which serve also to hold a negative plate in the same cell in electrical contact with the lead or conducting partitition between such cell and the next. The other cells are completed in the same manner, the last of the series having a negative plate in contact with the terminal lead plate.

The lead partition-plates are made higher than the active or battery plates, so that they extend up above the level of the solution and prevent slopping and the intermingling of the fluid of different cells.

The plates P N are square blocks or slabs of active material, made by packing litharge or red lead into open molds, then electrically treating and reducing the same until it becomes hard or self-supporting, so that it may be removed from the mold and used as a battery-plate.

What I claim is—

1. The combination, in a secondary battery, with the positive and negative plates of the same, of metallic partition-plates interposed between contiguous active plates and provided with thickened or flanged edges, and packing between the edges of said partition-plates, as set forth.

2. In a secondary battery, the combination, with the positive and negative active plates, of partitions dividing the battery into a series of compartments or cells and composed of thin sheets of lead with thickened or flanged edges, interposed between contiguous positive and negative plates, and strips or ribs of rubber between the flanges of the said partitions, as described.

3. In a secondary battery, the combination, with partitions dividing the battery up into a number of compartments or cells and composed of thin lead sheets with thickened or flanged edges, and rubber packing between the edges or flanges of adjacent partitions, of positive and negative plates or blocks of active material, and interposed strips of insulating material for maintaining the same in contact with the partitions, as set forth.

HARRY E. DEY.

Witnesses:
E. B. DILLINGHAM,
W. C. HIBBARD.